(12) United States Patent
Lee et al.

(10) Patent No.: US 6,459,845 B1
(45) Date of Patent: Oct. 1, 2002

(54) VARIABLE OPTICAL ATTENUATOR

(75) Inventors: Jung Hyun Lee, Suwon; Yoon Shik Hong, Sungnam; Hyun Kee Lee, Suwon; Sung Cheon Jung, Seoul, all of (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/094,330

(22) Filed: Mar. 8, 2002

(30) Foreign Application Priority Data

Dec. 6, 2001 (KR) .............................. 01-77035

(51) Int. Cl.[7] .............................. G02B 6/10; G02B 6/26
(52) U.S. Cl. .......................... 385/140; 385/19; 385/18; 385/16; 385/25; 385/31
(58) Field of Search .............................. 385/15, 16, 18, 385/19, 25, 31, 140

(56) References Cited

U.S. PATENT DOCUMENTS

| 5,025,346 A | 6/1991 | Tang et al. .................. 361/283 |
| 6,229,640 B1 | 5/2001 | Zhang ........................ 359/290 |
| 6,388,359 B1 * | 5/2002 | Duelli et al. ................ 310/309 |
| 2001/0033731 A1 * | 10/2001 | O'Keefe at al. ............ 385/140 |
| 2002/0054748 A1 * | 5/2002 | Hsu ........................... 385/140 |

FOREIGN PATENT DOCUMENTS

WO    WO 98/12589    3/1998

* cited by examiner

Primary Examiner—Evelyn A Lester
(74) Attorney, Agent, or Firm—Darby & Darby

(57) ABSTRACT

A variable optical attenuator to provide a new drive mechanism for an actuator, whereby the amount of attenuation does not increase in geometric progression as voltage increases, and an exceptional resolution effect is achieved. The variable optical attenuator comprises a transmission fiber for transmitting beams of light, a reception fiber arranged on the same axis with the transmission fiber and receiving the light beams transmitted by the transmission fiber, a variable shutter arranged between the transmission and reception fibers, and moving vertically to cut off or transmit the light beams, thereby controlling an amount of attenuation, the variable shutter cutting off the light to have a maximum amount of attenuation at an initial position, a comb actuator for driving the variable shutter, and a spring for generating a spring force to return the variable shutter to its initial position, the spring force not being applied in the initial position having the maximum amount of attenuation when a drive voltage of the comb actuator is not applied, and spring force being applied when the variable shutter is driven.

4 Claims, 6 Drawing Sheets

$y = -2.5901x + 6.4895$
$R^2 = 0.9715$

VARIABLE OPTICAL ATTENUATOR

BACKGROUND OF THE INVENTION

1. Field of the Invention

The present invention relates to an optical attenuator, and more particularly to a comb drive actuator using electrostatic force.

2. Description of the Related Art

As well known to those skilled in the art, a drive mechanism using electrostatic force is commonly used to drive a VOA (variable optical attenuator).

A comb actuator recommended by the university of California, U.S.A is well described in U.S. Pat. No. 5,025,346. This drive mechanism is widely employed because of its relative simplicity in manufacturing process and structural characteristics compared with other drive mechanisms.

A drive mechanism disclosed in PCT Publication No. WO98/12,589 uses dual comb actuators: one used when light is cut off and the other used when light is not cut off.

A drive mechanism disclosed in U.S. Pat. No. 6,229,640 uses a single comb actuator, which uses drive force of the comb actuator and spring force of a spring to cut off or transmit light.

Today, a MEMS variable optical attenuator of shutter-type using one of above described actuators is mainly used.

The shutter-type VOA places a shutter between a pair of transmission and reception fibers, wherein the shutter is moved so as to adjust a size of a junction between two fibers, thereby controlling a level of attenuation. Assuming that light is distributed according to a Gaussian distribution of one dimension, the level of attenuation [dB unit] decreases significantly as a light block distance increases, as shown in a graph in FIG. 1. If it is assumed that light is distributed according to a Gaussian distribution of two dimensions, then the decrease in the level of attenuation becomes more severe.

The level of attenuation decreases as the light block distance increases, and is proportional to the third power of the light block distance, as shown in FIG. 1.

The light block distance is proportional to the second power of a drive voltage, as shown in the following equation 1. Hence, the level of attenuation is proportional to the fifth power of the drive voltage.

$$f = \frac{\varepsilon n_c t}{d} \times V^2 \quad (1)$$

$$\delta = f/k = \frac{\varepsilon n_c t}{kd} \times V^2 \quad (2)$$

Here, "f" is a drive force generated from the comb actuator, and "δ" is a displacement. "V" is a voltage and "ε" is a permittivity, $\varepsilon = 8.85 \times 10^{-12}$ F/m. "$n_c$" is the number of combs and "t" is a thickness of a structure while "d" is a gap between the combs and "k" is a spring constant.

In the equation 2, the displacement of the actuator is proportional to the second power of the applied voltage when other variables are constant. Let's fix a voltage causing maximum displacement to 24V in the present invention.

The level of attenuation is proportional to the third power of the displacement "δ", thus this can be represented by the following third-order equation 3:

$$\text{Attenuation[dB]} = a\delta^3 + b\delta^2 + c\delta + d \quad (3)$$

Where, "a", "b", "c" and "d" are constants.

The displacement "δ" is proportional to the second power of the drive voltage, thus the level of attenuation can be represented by the following high-order equation:

$$\text{Attenuation[dB]} = \alpha V^5 + \beta V^4 + \gamma V^3 + d \quad (4)$$

Here, "α", "β", "γ" and "d" are constants.

As can be seen in the equation 4, the level of attenuation is given as a high-order, which is at least fifth-order, function of the drive voltage. Thus, a resulting graph changes more abruptly in its shape. This resulting graph is well illustrated in FIG. 2.

As described above, the conventional optical attenuator of shutter-type has a disadvantage in that a voltage-displacement characteristic due to the structure of the comb actuator and a Gaussian distribution of light wavelengths degrades linearity upon transferring data, thereby causing a performance problem.

In the structure of the conventional attenuator, the light block distance is proportional to the second power of the drive voltage, and the amount of attenuation of light increases in geometric progression with respect to the light blocking distance. Therefore, a relationship between the drive voltage and the amount of attenuation is represented by a third graph in FIG. 3.

As shown in FIG. 3, the amount of attenuation of light increases non-linearly as the light block distance increases, on account of light distributed according to a Gaussian distribution. By analyzing the first and second graphs, we can see that the amount of attenuation increases in geometric progression as the voltage increases, thereby causing a big problem in resolution.

In short, the voltage-displacement characteristic due to the structure of the comb actuator and a Gaussian distribution of light wavelengths degrades linearity upon transferring data, thereby causing a performance problem.

SUMMARY OF THE INVENTION

Therefore, the present invention has been made in view of the above problems, and it is an object of the present invention to provide a variable optical attenuator having a new drive mechanism to adjust an initial position of a variable mirror or variable shutter, and an additional differential circuit in order to solve performance problems occurring in a conventional MEMS comb drive variable optical attenuator, thereby securing linearity upon transferring data.

In accordance with one aspect of the present invention, the above and other objects can be accomplished by the provision of a variable optical attenuator comprising a transmission fiber for transmitting beams of light; a reception fiber arranged on the same axis with the transmission fiber and receiving the light beams transmitted by the transmission fiber; a variable shutter arranged between the transmission and reception fibers, and moving vertically to cut off or transmit the light beams, thereby controlling an amount of attenuation, the variable shutter cutting off the light to have a maximum amount of attenuation at an initial position; a comb actuator for driving the variable shutter; and a spring for generating a spring force to return the variable shutter to its initial position, the spring force not being applied in the initial position having the maximum amount of attenuation when a drive voltage of the comb actuator is not applied, and spring force being applied when the variable shutter is driven.

In accordance with another aspect of the present invention, the above and other objects can be accomplished by the provision of a variable optical attenuator comprising a transmission fiber for transmitting beams of light; a reception fiber arranged at an angle to the transmission fiber and receiving the light beams transmitted by the transmission fiber; a variable mirror arranged between the transmission and reception fibers, and moving vertically to reflect the light beams, thereby controlling an amount of attenuation, the variable mirror reflecting the light to have the maximum amount of attenuation at an initial position; a comb actuator for driving the variable mirror; and a spring for generating a spring force to return the variable mirror to its initial position, the spring force not being applied in the initial position having the maximum amount of attenuation when drive voltage of the comb actuator is not applied, and being applied when the variable mirror is driven.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
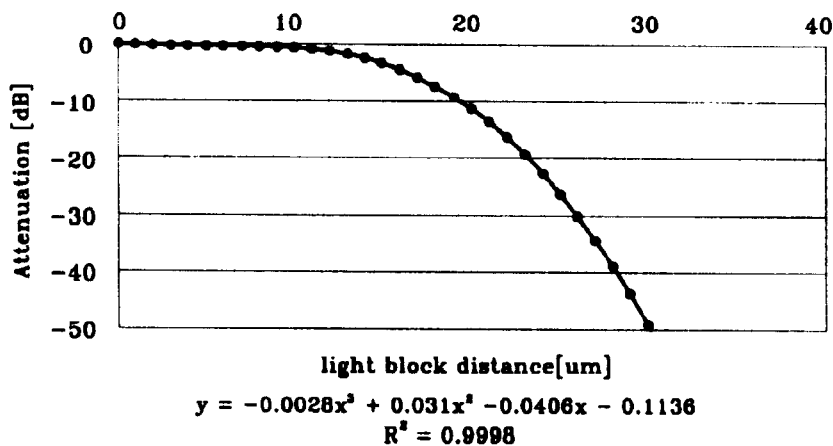
FIG. 1 is a graph showing a light block distance-level of attenuation relation in a conventional MEMS variable optical attenuator of shutter-type.
Figure 2:
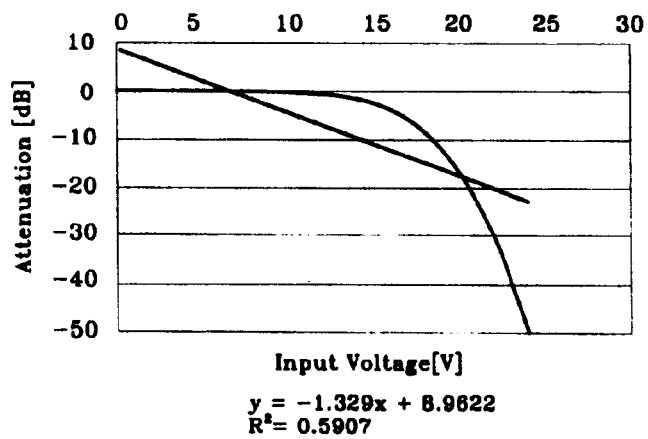
FIG. 2 is a graph showing a drive voltage-level of attenuation relation in the conventional MEMS variable optical attenuator of shutter-type.
Figure 3:
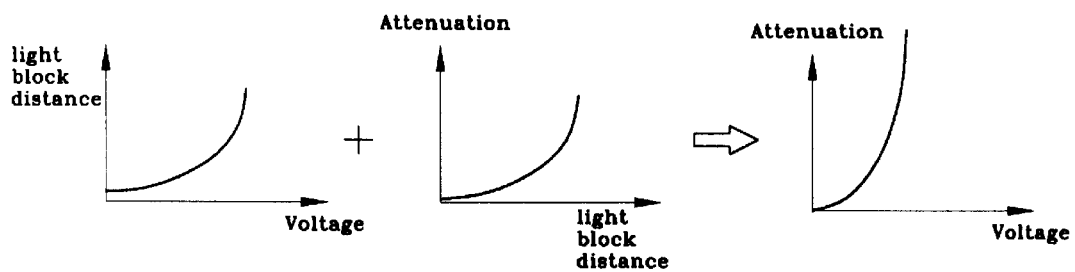
FIG. 3 is a schematic view showing graphs indicative of a voltage-light block distance relation, a light block distance-level of attenuation relation, and a voltage-level of attenuation relation, respectively, in the conventional MEMS variable optical attenuator of shutter-type.
Figure 4:
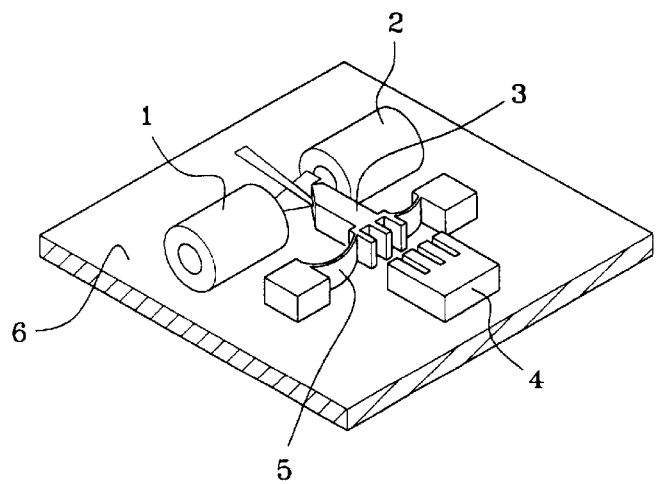
FIG. 4 is a view showing the structure of a variable optical attenuator in accordance with an embodiment of the present invention.

FIG. 4 is a view showing the structure of a variable attenuator in accordance with an embodiment of the present invention. A description will be given hereinafter with reference to FIG. 4.

As shown in FIG. 4, the variable optical attenuator includes a transmission fiber 1 for transmitting beams of light and a reception fiber 2 arranged on the same axis with the transmission fiber 1 and receiving the light beams transmitted by the transmission fiber 1. Between the transmission fiber 1 and reception fiber 2, a variable shutter 3 is interposed. The variable shutter 3 is moved to cut off or transmit the light beams, thereby controlling an amount of attenuation. The variable shutter 3 is configured to cut off the light in order to have a maximum amount of attenuation at its initial position.

The variable optical attenuator further includes a comb actuator 4 for driving the variable shutter 3. The comb actuator 4 is configured to make the displacement of the variable shutter be proportional to the second power of a drive voltage.

The variable optical attenuator further includes a spring 5 for generating a spring force to return the variable shutter to its initial position. The spring 5 generates no spring force at an initial state in which no drive voltage is applied to the comb actuator 4, while generating the spring force when the variable shutter 3 is moved.

The reference numeral 6 denotes a base plate. The base plate supports the transmission fiber 1, reception fiber 2, variable shutter 3, comb actuator 4 and spring 5.

Basic conditions for a drive mechanism in accordance with the present invention will be described hereinafter.

First, the comb actuator is configured to make the displacement of the variable shutter be proportional to the second power of a drive voltage.

Next, the reception fiber 2 must be configured to receive no beam of light in the initial state of the comb actuator 4 and spring 5. In other words, the amount of attenuation must be a maximum in the initial state in which no drive voltage is applied to the comb actuator 4. In the initial state, all of the light beams are cut off and the spring 5 generates no spring force. As a drive voltage is applied, the variable shutter 3 is gradually opened, whereby the amount of the transmitted light beams increases.

Figure 5:
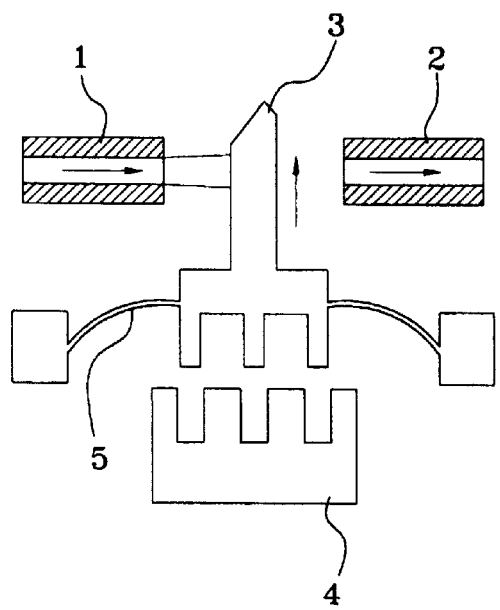
FIG. 5 is a view showing an initial position of a variable shutter in accordance with the embodiment of the present invention.

A description of these configurations will be given hereinafter with reference to FIG. 5. FIG. 5 is a view showing an initial position of the variable shutter in accordance with the present invention.

In an initial state, the variable shutter 3 is in its highest position in which the spring 5 generates no spring force and no light is transmitted to the reception fiber 2. The variable shutter 3 is gradually moved to a lower position by the comb actuator 4 so that beams of light are transmitted and the spring 5 generates a spring force, whereby the amount of the light beams is controlled.

Figure 6:
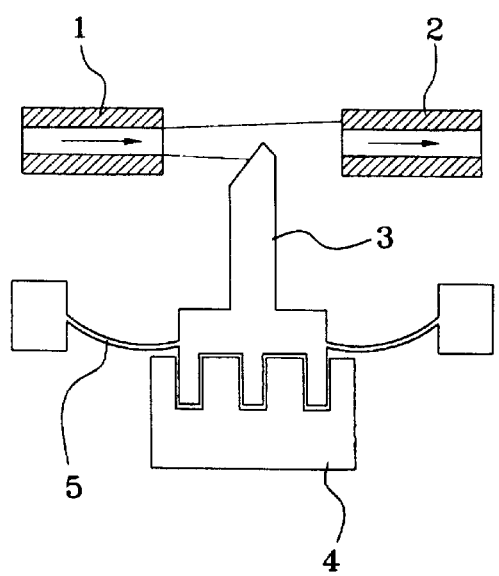
FIG. 6 is a view showing a position of the variable shutter when a spring generates a spring force, thereby adjusting an amount of beams of light.

FIG. 6 is a view showing a position of the variable shutter 3, wherein the spring force of the spring 5 is applied to the variable shutter to control the amount of the light beams.

Namely, the variable shutter of the present invention is configured to adjust its initial position, as described above, which is different from the conventional optical attenuator.

Figure 7:
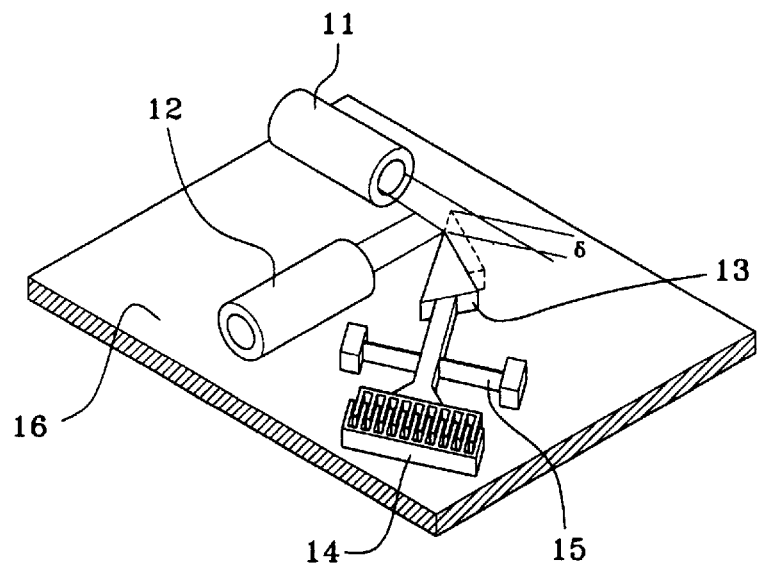
FIG. 7 is a view showing the structure of a variable optical attenuator in accordance with another embodiment of the present invention.

FIG. 7 is a view showing the structure of a variable optical attenuator in accordance with another embodiment of the present invention. A description will be given hereinafter with reference to FIG. 7.

As shown in FIG. 7, the variable optical attenuator includes a transmission fiber 11 for transmitting beams of light and a reception fiber 12 arranged at an angle to the transmission fiber 11 and receiving the light beams transmitted by the transmission fiber 11. Between the transmission fiber 11 and reception fiber 12, a variable mirror 13 is interposed. The variable mirror 13 is moved to reflect the light beams, thereby controlling an amount of attenuation. The variable mirror 13 is configured to reflect the light in order to have a maximum amount of attenuation at its initial position.

The variable optical attenuator further includes a comb actuator 14 for driving the variable mirror 13. The comb actuator 14 makes the displacement of the variable mirror be proportional to the second power of a drive voltage.

The variable optical attenuator further includes a spring 15 for generating a spring force to return the variable mirror 13 to its initial position. The spring 15 generates no spring force at an initial state in which no drive voltage is applied to the comb actuator 14, while generating the spring force when the variable mirror 13 is moved.

In the initial state, the variable mirror 13 is in its lowest position in which the spring 15 generates no spring force and no light beam is transmitted to the reception fiber 12 from the transmission fiber 11. The variable mirror 13 is gradually moved to a higher position so that the light beams are reflected and the spring 15 generates a spring force, whereby the amount of the light beams is controlled. A reference numeral 16 denotes a base plate. The base plate supports the transmission fiber 11, reception fiber 12, variable mirror 13, comb actuator 14 and spring 15.

Figure 8:
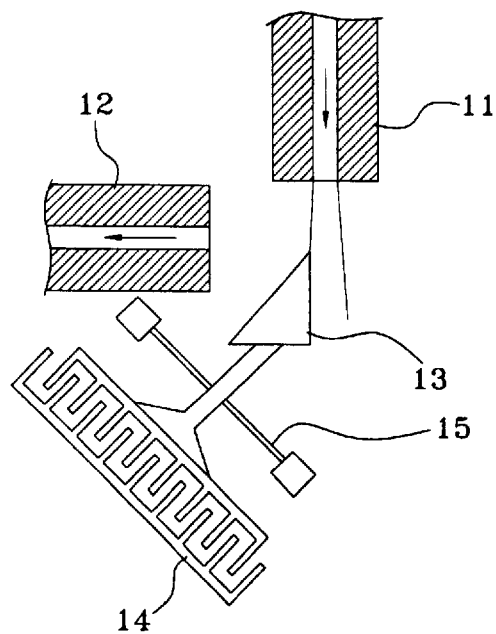
FIG. 8 is a view showing an initial position of a variable mirror in accordance with the embodiment of the present invention.
Figure 9:
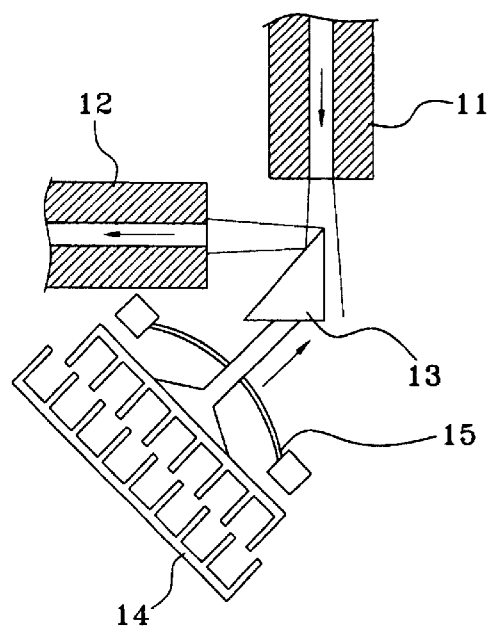
FIG. 9 is a view showing a position of the variable mirror when a spring generates a spring force, thereby adjusting an amount of beams of light.

FIGS. 8 and 9 are views showing the initial position of the variable mirror 13 in which the spring 15 generates no spring force, and the position in which the spring 15 generates the spring force, respectively.

A relationship between a drive voltage of the comb actuator and a displacement δ, which is a difference between the initial position of the variable shutter or mirror and the position in which the spring generates the spring force, is represented by the following equation 5:

$$\delta = KV^2 \quad (5)$$

A light block distance in the embodiments of the present invention can be obtained by the following equation 6:

$$x = \delta_{max} - \delta = \delta_{max} KV^2 \quad (6)$$

Where, "$\delta_{max}$" represents a maximum light block distance of the comb actuator. The light block distance can be represented by a negative polynomial of order two with respect to voltage, in the equation 6.

Figure 10:
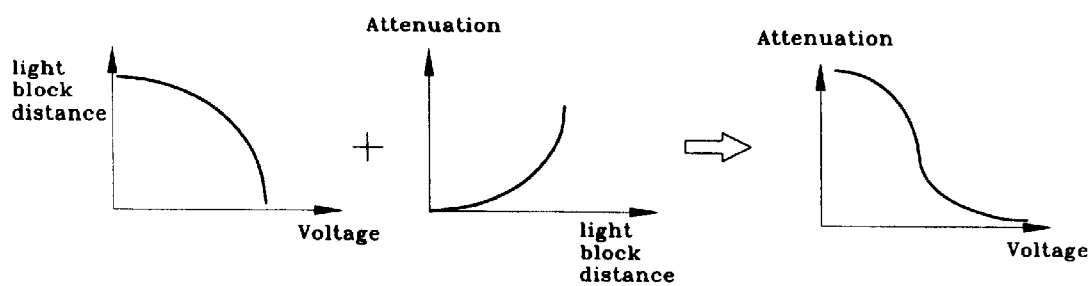
FIG. 10 is a schematic view showing graphs indicative of a voltage-light block distance relation, a light block distance-level of attenuation relation, and a voltage-level of attenuation relation, respectively, in an MEMS variable optical attenuator of shutter-type in accordance with the present invention.

A first graph in FIG. 10 showing a light block distance-voltage relation is obtained from the equation 6.

An amount of attenuation in relation to a light block distance is shown in a second graph in FIG. 10. The amount of attenuation in relation to a drive voltage is shown in a third graph in FIG. 10, which is derived from the first and second graphs. The amount of attenuation is initially at its maximum and gradually decreases as the drive voltage increases, which is different from the conventional device by which the amount of attenuation increases in geometric progression with respect to the drive voltage.

The optical attenuator in accordance with the present invention is configured such that the reception fiber cannot receive the light at the initial state in which the voltage is not applied to the comb actuator, thereby having the maximum amount of attenuation at the initial state, and then the amount of attenuation varies gradually as the drive voltage increases.

The graph showing voltage-amount of attenuation relation has higher resolution when the drive voltage is high, and more linearity in the attenuation curve as a whole.

Figure 11:
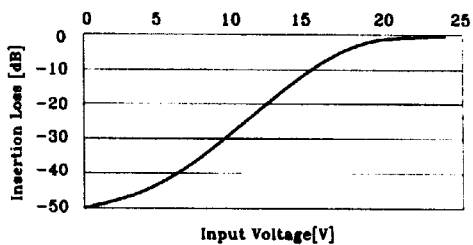
FIG. 11 is a graph schematically showing a drive voltage-level of attenuation, which is caused by an insertion loss, relation in the MEMS variable optical attenuator of shutter-type in accordance with the present invention.

FIG. 11 is a graph showing variations in the characteristics of the comb actuator when beams of light distributed according to a Gaussian distribution is used. Referring to FIG. 11 showing an insertion loss-drive voltage relation, it can be seen that a level of attenuation is low at a maximum drive voltage.

Figure 13:
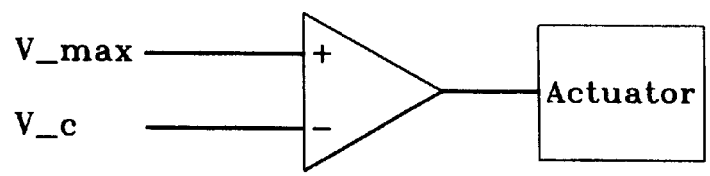
FIG. 13 is a schematic view showing the drive voltage differential circuit in accordance with the present invention.

A differential circuit as shown in FIG. 13 can be used to easily make the level of attenuation be at maximum at the maximum drive voltage. A relationship between a controlled drive voltage "$V_c$" and the maximum drive voltage "$V_{max}$" is generally represented by the following equation 7:

$$V_c = V_{max} - V \quad (7)$$

Figure 12:
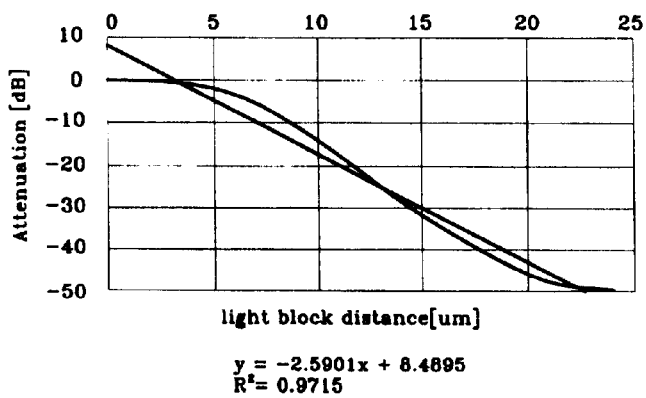
FIG. 12 is a graph schematically showing a light block distance-level of attenuation relation by using a drive voltage differential circuit in accordance with the present invention.

FIG. 12 is a graph schematically showing a light block distance-level of attenuation relation by using the differential circuit in accordance with the present invention. Referring to FIG. 12, it can be seen that the level of attenuation decreases as the controlled drive voltage "$V_c$" increases linearly. The relationship represented by the equation 7 can be explained by the following equation 8:

$$\delta_{max} = KV_{max} \quad (8)$$

Referring to FIG. 12, the level of attenuation in relation to an actual drive voltage "V" can be seen. The actual drive voltage and controlled drive voltage are 24V and 0V, respectively, which are opposite to those in FIG. 11.

When the amount of attenuation increases as the drive voltage increases, it is preferable to use the differential circuit in order to secure linearity upon transferring data, thereby easily solving the problems of the conventional attenuator.

In the present invention the amount of attenuation is more linear, and resolution is not degraded under a predetermined limit. This can be seen using a regression line. A coefficient of determination of the regression line is $R^2=0.97$ in the present invention while $R^2=0.59$ when the conventional mechanism is used. Resolution is at its minimum in the middle of the maximum and minimum drive voltages.

As apparent from the above description, the present invention provides a new drive mechanism to be able to solve the performance problems of the conventional variable optical attenuator, whereby the amount of attenuation does not increase in geometric progression as voltage increases, and an exceptional resolution effect is achieved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A variable optical attenuator comprising:
   a transmission fiber for transmitting beams of light;
   a reception fiber arranged on the same axis with the transmission fiber and receiving the light beams transmitted by the transmission fiber;
   a variable shutter arranged between the transmission and reception fibers, and moving vertically to cut off or transmit the light beams, thereby controlling an amount of attenuation, the variable shutter cutting off the light to have a maximum amount of attenuation at an initial position;

a comb actuator for driving the variable shutter; and a spring for generating a spring force to return the variable shutter to its initial position, the spring force not being applied in the initial position having the maximum amount of attenuation when a drive voltage is not applied to the comb actuator, and spring force being applied when the variable shutter is moved.

2. The variable optical attenuator as set forth in claim 1, wherein the comb actuator has a differential circuit characterized as following equation, for linearly varying the amount of attenuation of the light as the drive voltage increases $$V_c = V_{max} - V$$

where, $V_c$: control driving voltage, $V_{max}$: maximum voltage.

3. A variable optical attenuator comprising:

a transmission fiber for transmitting beams of light;

a reception fiber arranged at a predetermined angle to the transmission fiber and receiving the light beams transmitted by the transmission fiber;

a variable mirror arranged between the transmission and reception fibers, and moving vertically to reflect the light beams, thereby controlling an amount of attenuation, the variable mirror reflecting the light to have the maximum amount of attenuation at an initial position;

a comb actuator for driving the variable mirror; and a spring for generating a spring force to return the variable mirror to its initial position, the spring force not being applied in the initial position having the maximum amount of attenuation when the drive voltage is not applied to the comb actuator, and being applied when the variable mirror is moved.

4. The variable optical attenuator as forth in claim 3, wherein the comb actuator has a differential circuit characterized as following equation, for linearly varying the amount of attenuation of the light as the drive voltage increases $$V_c = V_{max} - V$$

where, $V_c$: control driving voltage, $V_{max}$: maximum voltage.

* * * * *